Patented May 24, 1949

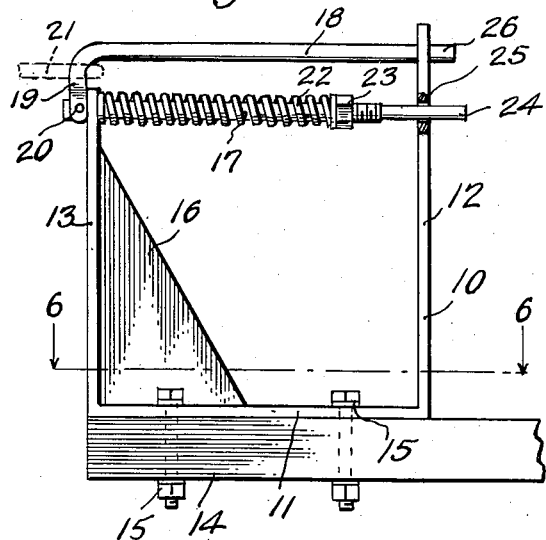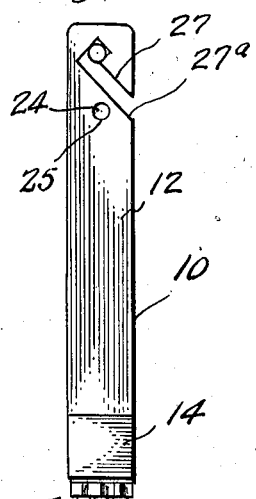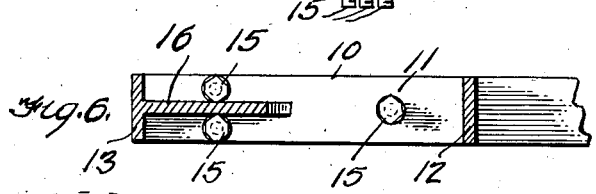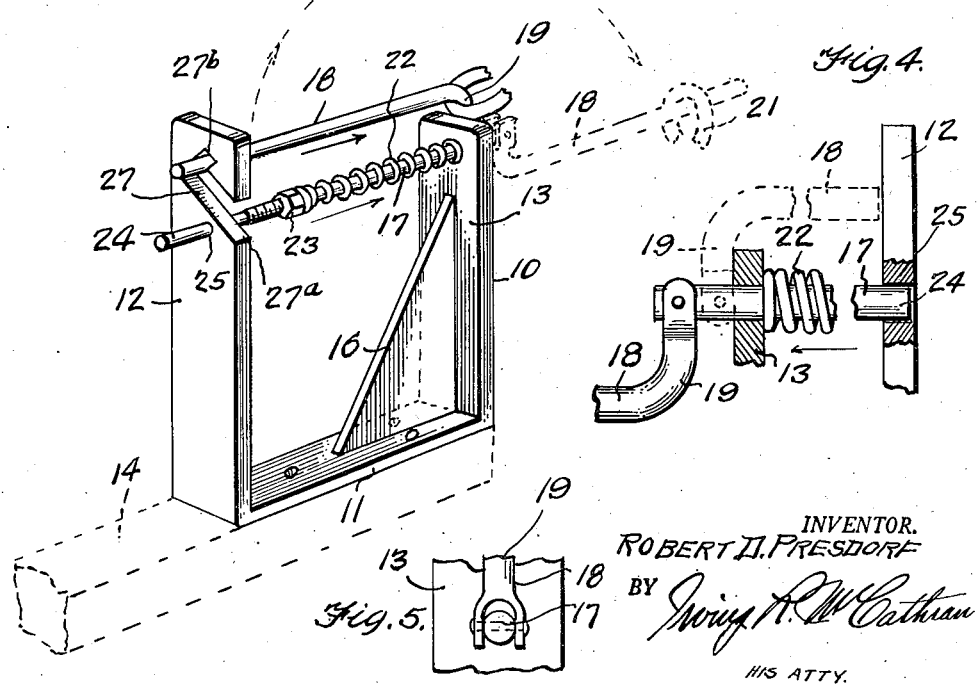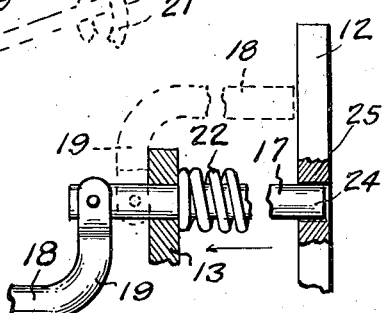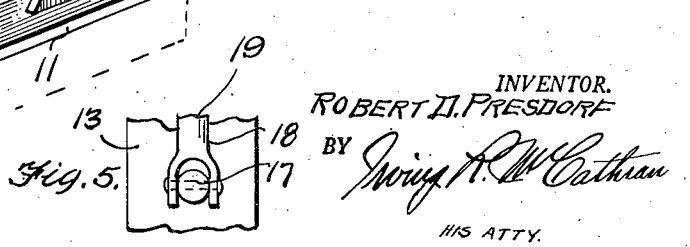

2,470,862

UNITED STATES PATENT OFFICE 2,470,862

SAFETY HITCH

Robert D. Presdorf, Decatur, Ind.

Application July 15, 1947, Serial No. 761,017

1 Claim. (Cl. 280—33.16)

This invention relates to a safety hitch, and has for one of its objects the production of a simple and efficient means for automatically releasing the hitch should the implement which is connected thereto come in contact with a stone or other stationary object, thereby preventing damage to the implement.

A further object of this invention is the production of a safety hitch which is provided with means for quickly and easily rehitching the same after the hitch has been released by contacting a stationary object.

Other objects and advantages of this invention will appear throughout the following specification and claim.

In the drawing:

Figure 1 is a side elevational view of the safety hitch;

Figure 2 is a rear elevational view;

Figure 3 is a perspective view of the hitch, the draw-bar of a tractor being shown in dotted lines;

Figure 4 is an enlarged longitudinal fragmentary sectional view illustrating the position of the parts when the hitch is released;

Figure 5 is a fragmentary rear elevational view illustrating the manner in which the latching rod is pivotally connected to one end of the pull rod;

Figure 6 is a horizontal sectional view taken on line 6—6 of Figure 1.

By referring to the drawing, it will be noted that 10 designates the hitch frame which preferably constitutes a metal casting comprising a base plate 11, an upwardly extending latching arm 12 and a spaced upwardly extending pull-rod supporting arm 13. The base plate 11 is preferably secured to the tractor draw bar 14 by means of bolts 15 and this plate 11 rests upon the upper face of the tractor draw-bar 14 near the rear end of the draw bar. The arm 13 is provided with an angle web brace 16 which is formed integrally with the inner face of the arm 13 and the upper face of the base plate 11, as shown. This brace 16 extends to a point near the top of the arm 13 adjacent the pull-rod 17 which extends transversely through the arm 13, and is slidable therethrough.

The pull-rod 17 supports a latching rod 18, the downwardly curved end 19 being pivotally connected to the protruding end of the pull-rod 17 which extends beyond the arm 13, as shown in Figure 1. The connecting link 21 of the implement to be attached to the hitch 10 fits around the end 19 of the latching rod 18 for the purpose of attaching the implement to the tractor hitch. A coil spring 22 is carried by the latching rod 18, and the tension of this spring 22 may be adjusted by means of the nut 23 which is threaded upon the rod 17 to normally hold the downwardly curved end 19 in flat abutting engagement with the outer face of the pull-rod supporting arm 13. The opposite end 24 is slidably mounted through the aperture 25 formed in the arm 12.

The latching rod 18 is provided with an outer latching end 26 which detachably fits within the inverted bayonet slot 27 formed in the upper end of the arm 12. The fact that the downwardly curved end 19 normally is in flat abutting engagement with the outer face of the pull-rod supporting arm 13 and normally is held in this position by the spring 22, the latching end 26 will be at all times held in the bayonet slot 27 against accidental release by jarring until manually released by an operator, or until released by excessive pull should the implement carrying the hitch strike an obstruction. The rod 17 is freely rotatable relative to the arms 12 and 13, as well as being reciprocably mounted thereon, so that the outer end 26 of the latching rod 18 may be freely moved into the bayonet slot 27 for latching the same.

It should be noted that pull of the link 21 of the implement being pulled by the tractor carrying the draw-bar 14 will be against the tension of the spring 22 and should the implement strike an obstruction, the spring 22 will yield further until the latching end 26 of the rod 18 is pulled transversely of the arm 12 and out of the bayonet slot 27. The latching rod 18 will then swing to the position shown in dotted lines in Figure 3, and the link 21 will slide off the rod 18 thereby disengaging the implement from the hitch 10.

The hitch again may be quickly and easily fastened by connecting the link 21 to the latching rod 18 and then fitting the latching end 26 within the slot 27. Since the bayonet slot 27 is inverted, the end 26 is placed through the lower end 27ª thereof and moved upwardly into the laterally offset socket 27ᵇ thereof. The normal pull of the link 21 being above the pivot 20, this will tend to hold the end 26 in the socket 27ᵇ until excessive pressure is applied to the spring 22 to automatically release the latching rod 18.

As will be noted by carefully considering Figure 2, the bayonet slot is preferably formed at an angle of 45° and the socket 27 thereof is preferably formed at a reverse angle of 45° at the inner end of the entrance portion of the bayonet slot.

What I claim as new is:

A hitch comprising a frame having spaced arms, a pull-rod slidable transversely of said arms, a latching rod having a depending end pivotally connected to one end of the pull-rod beyond the frame, said latching rod also having a protruding latching end, one of said arms having an inverted bayonet slot for receiving the latching end of said pull-rod to hold the latching rod in a latched position, the depending end of said latching rod being adapted to engage a towing connection for a towed vehicle and to automatically release the towing connection when the latching rod is released, and a spring carried by said pull-rod and abutting the frame to releasably and normally hold the depending end of the latching rod in flat abutting relation with the outer face of said frame and to thereby hold the latching end of the latching rod against accidental release by jarring until said latching rod is automatically released by excessive pull thereon should the implement carrying the hitch strike an obstruction.

ROBERT D. PRESDORF.

REFERENCES CITED

The following references are of record in the file of this patent:

UNITED STATES PATENTS

| Number | Name | Date |
|---|---|---|
| 1,277,058 | Garford | Aug. 27, 1918 |
| 1,343,908 | Edstrom | June 22, 1920 |
| 1,384,195 | Hulsebos et al. | July 12, 1921 |